United States Patent
Angelino et al.

(10) Patent No.: US 10,956,577 B2
(45) Date of Patent: Mar. 23, 2021

(54) METHODS AND APPARATUS FOR DEFENDING AGAINST MEMORY-RELATED ATTACKS ON DEVICES

(71) Applicant: Arm IP Limited, Cambridge (GB)

(72) Inventors: Alessandro Angelino, London (GB); Milosch Meriac, Cambridge (GB); Brendan James Moran, Histon (GB)

(73) Assignee: ARM IP Limited, Cambridge (GB)

( * ) Notice: Subject to any disclaimer, the term of this patent is extended or adjusted under 35 U.S.C. 154(b) by 254 days.

(21) Appl. No.: 16/113,241

(22) Filed: Aug. 27, 2018

(65) Prior Publication Data

US 2019/0073481 A1   Mar. 7, 2019

(30) Foreign Application Priority Data

Sep. 7, 2017   (GB) ..................................... 1714426

(51) Int. Cl.
   *G06F 21/57*   (2013.01)
   *G06F 21/52*   (2013.01)
   *G06F 8/65*    (2018.01)

(52) U.S. Cl.
   CPC .............. *G06F 21/577* (2013.01); *G06F 8/65* (2013.01); *G06F 21/52* (2013.01); *G06F 2221/034* (2013.01)

(58) Field of Classification Search
   CPC ........ G06F 21/577; G06F 21/52; G06F 21/62; G06F 21/78; G06F 21/575; G06F 21/554; G06F 21/57; G06F 21/572; G06F 2221/034
   See application file for complete search history.

(56) References Cited

U.S. PATENT DOCUMENTS

| | | | |
|---|---|---|---|
| 10,360,614 B1* | 7/2019 | Rifkin | G06Q 30/0631 |
| 2013/0132690 A1* | 5/2013 | Epstein | G06F 11/1451 |
| | | | 711/159 |
| 2016/0021121 A1* | 1/2016 | Cui | G06F 21/54 |
| | | | 726/1 |
| 2017/0220405 A1* | 8/2017 | Larsen | G06F 11/0775 |
| 2018/0046585 A1* | 2/2018 | Okhravi | G06F 16/245 |

FOREIGN PATENT DOCUMENTS

WO   2017/131621   8/2017

OTHER PUBLICATIONS

Combined Search and Examination Report for GB1714426.2, dated Feb. 2, 2018, 6 pages.

* cited by examiner

*Primary Examiner* — Alexander Lagor
*Assistant Examiner* — Vu V Tran
(74) *Attorney, Agent, or Firm* — Nixon & Vanderhye, P.C.

(57) ABSTRACT

An apparatus and methods are provided to defending device against attacks. When it is determined that a device is under attack, a determination is made as to whether a layout of objects within said at least one resource at said device is protecting said device against said attack. The determination is then transferred to a remote server together with a layout of the resource at the device. When it is determined that the layout of objects within the at least one resource at the device is not protecting the device against the attack, then the layout of the at least one resource is changed. Either the remote server or the device may determine whether to change the layout in response to the attack.

20 Claims, 5 Drawing Sheets

ND APPARATUS FOR
METHODS AND APPARATUS FOR DEFENDING AGAINST MEMORY-RELATED ATTACKS ON DEVICES

This application claims priority to GB Patent Application No. 1714426.2 filed 7 Sep. 2017, the entire contents of which is hereby incorporated by reference.

The present techniques relate to methods and apparatus for mitigating the risk of memory-related attacks on devices. More particularly, the techniques relate to apparatus and methods for preventing memory-related attacks from transferring from one device to another device.

In microcontrollers which are used in Internet of Things (IoT) devices, different threads are assigned resources, such as memory sections (stack, heap, pools). The allocation and assignment of such resources is usually done at startup-time and the address of a specific resource assigned to a given thread is known in advance.

This information regarding the address of each resource may be used to tailor specific memory-related attacks, such as buffer overflow attacks, where an attacker knows or guesses some of the memory layout of the device. If an attacker can exploit a buffer overflow to overwrite the return address of a function, the attacker can execute code at an arbitrary location. Such exploits may scale to many devices of the same type, or may become universal, when devices, that deploy the same firmware, use the same address layout, assigning the same address to the same resource.

In addition, when an attack on a device has been detected, time is required for the creation of a fix for such exploits, before the fix can be deployed to all of the devices, leaving many devices exposed for a long period of time.

According to a first technique, there is provided a machine implemented method for defending a device comprising at least one resource against attacks. The method comprises: determining that said device is subject to an attack; determining whether a layout of objects within said at least one resource at said device is protecting said device against said attack; transferring said determination and said layout of said at least one resource associated with said determination to a remote monitoring server; determining that said layout of said at least one resource should be changed; changing said layout of said at least one resource by reordering said objects within said at least one resource with respect to each other; and tracking said reordered layout of said at least one resource.

According to a second technique, there is provided a machine implemented method for defending a plurality of devices against attacks, each device comprising at least one resource. The method comprising: receiving an attack report from at least one of said plurality of devices, said attack report comprising an indication of a layout of objects within said at least one resource at said device, and a determination as to whether said layout of said at least one resource is protecting said device against said attack; determining that said layout of said at least one resource should be changed; and instructing said at least one of said plurality of devices to change said layout of said at least one resource at said device.

According to a third technique, there is provided a supervisor module for defending a device comprising at least one resource against attacks. The supervisor module comprising: a monitoring module for determining that said device is subject to an attack; a rating module for determining whether a layout of objects within said at least one resource at said device is protecting said device against said attack; a communication module for transferring said determination and an indication of said layout of said at least one resource associated with said determination to a remote monitoring server; a reorder module for changing said layout of said at least one resource by reordering said objects within said at least one resource with respect to each other when is it determined that said layout of said at least resource should be changed; and a tracking module for tracking said reordered layout of said at least one resource.

According to a fourth technique, there is provided a supervisor module for defending a device comprising at least one resource against attacks. The supervisor module comprising: a communications module for receiving a relocatable firmware update image from a remote server; a reorder module for changing a layout of said at least one resource by reordering objects within said at least one resource with respect to each other; and wherein said reorder module installs said relocatable firmware update image by changing said layout of said at least one resource following installation of said relocatable firmware update image to generate a relocated firmware update image; and a tracking module for tracking said reordered layout of said at least one resource.

According to a fifth technique, there is provided a remote monitoring server for defending a plurality of devices against attacks, each device comprising at least one resource. The server comprising: a communications module for receiving attack reports from at least one of said plurality of devices, said attack reports comprising a determination as to whether a layout of objects within said at least one resource at said device is protecting said device against said attack, and an indication of said layout of said objects within said at least one resource at said device; and a monitoring module for determining which of said received layouts protects said device against said attack; and wherein said communications module transmits said layout which is determined to protect said device against said attack to one or more of said plurality of devices.

According to a sixth technique, there is provided computer program product comprising program code for performing the methods described herein.

Embodiments will now be described with reference to the accompanying figures of which.

Address space layout randomization (ASLR) is a memory protection process whereby the address of each resource is relocated, each time the system is started. For example, each time the system is started, the base address of the application is randomized, the heap and stack are randomized, and shared libraries are loaded in random order. Such processes help to mitigate memory-related attacks, such as return-oriented programming (ROP) attacks. However, ASLR can require a table to be stored, in a MMU, mapping the randomised virtual address of the resource to the actual address of the hardware. Devices that do not have MMU's cannot take advantage of ASLR to mitigate against attacks.

In addition, in some devices and systems, such as ARM® Mbed™ operating systems, ARM® uVisor hypervisor, generic real-time operating system (RTOS) applications or multi-threading, the resources, such as the heap and stack, and the base address of the application cannot be placed in random locations due to constraints of the system.

Apparatus and methods are provided to reorder the layout of at least one resource of a device in order to defend against attacks on the device. When an attack is detected at the device, a reboot of the device is initiated, changing the order of the objects within the memory resources of the device. In addition, the different memory layouts of the resources of the device are monitored such that a layout which provides the best defense against an attack may be identified and distributed to other devices of the same type whilst the vendor works on a patch.

At runtime or at start-up time, the objects within the resources of the device, for example, in the global memory space and in the static libraries, may be reordered. This results in the objects being executed from unpredictable locations within the resources. In addition, the objects are not provided at the same relative positions within each resource every time the device is started. This reduces the chance of an attacker being able to guess the location of an object, and an attack against a device being successful. In addition, each device of the same type, at every run, will have a different, unpredictable layout within its resources. This reduces the chance of a successful attack against one device being portable to other devices of the same type.

An object may be a variable, data, a function etc. A variable is a value that can change. A function is a portion of a program that performs a specific task.

At system reboot, runtime or at start-up time, the objects within each resource are reordered with respect to each other (for example, stack memories are reordered with respect to each other within the stack). In addition, at system reboot, runtime or at start-up time, the initial pointers for the objects may also be reordered within the resource they point to (for example, the initial stack pointers for the stack memories are randomized within the stack they point to, so that it cannot be stated that the pointer of stack X is provided at the end of the memory section).

The objects and pointers for the objects may be randomly reordered within each resource. However, the reordering is not required to be a randomization. For example, an iterative generation based on a genetic algorithm may be utilised to generate the new reordered layout configurations, or an iterative generation based on a seed value may be utilised to generate the new reordered layout configurations. The seed value may then be exchanged between devices and a remote server, without the need to send the entire layout configuration itself.

Furthermore, the reordering which takes place at each device is different on a per-device level. For example, a seed value is used to generate a device specific configuration. This results in a very resilient device base against a wide range of attacks that require the attacker to know the locations of code and data objects.

Alternatively, or in addition, to changing the order of the objects and pointers within each resource at a system reboot, the order of the objects and pointers within each resource may be changed at a restart of a process. For example, instead of restarting the CPU, just the process is restarted, and the objects and pointers reordered, for example at a partial firmware update. Furthermore, a partial restart of a process is also possible. For example, a process may be stopped, whilst objects which are currently not in use are reordered, and then the process restarted.

Alternatively, or in addition, a device may comprise more than one resource, and each resource may be reordered independently of the other resources as required. For example, when an attack on a particular resource is detected, only the layout of that resource is reordered.

According to one embodiment, a seed value may be combined with a device specific identifier, to create a device specific seed value which may be utilised at the device to generate device specific reordered layout configurations. A global seed value ("initialization vector") for a type of device or for a firmware update for a type of device may be combined with the device specific identifier, via hash, secure hash or HMAC (keyed-hash message authentication code) to generate the device specific seed value. In the case of an HMAC secret, a device specific HMAC key can be used.

By knowing only the device specific identifier and the "initialization vector" (global seed value) a developer may generate the device-specific seed value. Using that device specific seed value, a developer may generate debug information consistent with the device specific layout configuration information to apply to a crash-log or core-dump of the (device-specific) remote device. A developer may also use the device-specific seed value to generate or perform a remote debug session with the correct, device-specific debug information.

According to one embodiment, the developer holds a master-secret and derives a device-specific secret from the device identifier and the master-secret. Then when the developer wants to understand what reordering has occurred at a specific device, the developer may use the device identifier to derive the device specific secret from the master secret, calculate the device specific seed value from the global seed value; perform the device-specific reordering using the determined device specific seed value and apply that to their local debug information. Consequently, the developer is able to debug with the correct device-specific layout or analyse device-specific crash dumps or error messages quoting code or data addresses with the correct device-specific layout. According to one embodiment, the device-specific secret may be a device-specific HMAC secret, however, HMAC is only one of many other possible key derivations which may be used, such as a device-specific AES (Advanced Encryption Standard) secret.

In the case of an HMAC secret, a developer may protect generation of the correct debug information to only the parties knowledgeable of that secret. The secret can optionally be changed for every new firmware compiled. The global seed value can be transmitted in plain text. In this way, the reordered layouts are kept a secret such that an attacker is not able to determine the reordered layouts.

According to one embodiment, the HMAC-secret may be restricted to the generator of the N out of M firmware images uploaded to the remote server—in the case of the device performing the reordering, the HMAC-secret may be update-specific and derived from the update-specific firmware key.

After the reordering, the HMAC secret key can be discarded, as long as the device-specific seed value is kept. The device-specific seed value may be communicated back to the server, so the server can keep track of which device runs which reordering.

Figure 1:
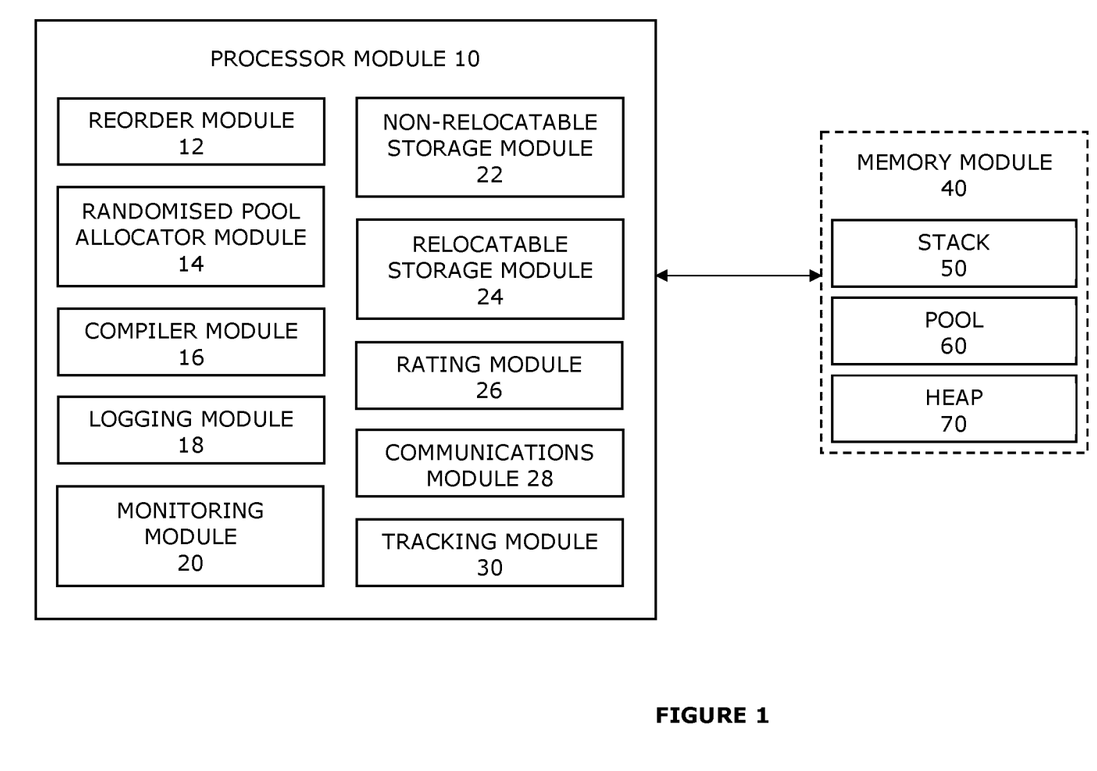
FIG. 1 illustrates schematically a processor module.

FIG. 1 illustrates a processor module which is provided at each device. The processor module 10 is coupled to at least one memory 40. The memory 40 may comprise the stack, heap, pool etc. A reorder module 12 is provided at the processor to (pseudo-)randomly reorder the location of the objects within each resource. In addition, a randomized pool allocator module 14 may be utilised by the reorder module 12 to allocate memories in a random way, whilst maintaining efficiency, for example, when assigning a random pool amongst a set of equally convenient pools. The reorder module 12 may comprise a pseudorandom number generator (PRNG) and/or a true random number generator (TRNG).

The layout of the reordered resources is tracked. The layout of a resource upon start-up is stored for later reference. In addition, whenever the layout of a resource is reordered/shuffled, the reordered layout of the resource is stored for later reference. One example of tracking is storing the layout in a relocation table, or storing the seed value used for generating the layout for later reference. The relocation table/seed value may be transmitted to the server for storage, or may be stored locally. The layout may then be reproduced, for verification, duplication or debug purposes.

Relocation information defining the (pseudo-)randomly reordered locations of the objects within each resource may be saved to a relocation table. The relocation table indicates which addresses in an image are updated in response to reordering the objects within a resource. A translation table may be generated from the relocation table and indicates where the objects within a resource have moved. For example, a translation table may map the source (original) location of each object within a resource to the destination (reordered) location of each object within the resource.

The relocation table may be saved to a tracking module 30 at the processor module 10. Alternatively, only the seed value may be required in order to determine the (pseudo-) randomly reordered locations of the objects within each resource.

The resource layout may be reordered on a per object basis, an object being a variable, data, or a function. The resource layout may be reordered on as small a unit level as required, or on as big a unit level as required. The smallest unit of code for which the memory layout may be reordered, is a function block, each function being reordered with respect to other functions. The smallest unit of data for which the memory layout may be reordered, is a link time variable. The link time variables may be as small as a single byte or as large as they get, in the case of arrays or data structures. When a resource layout is reordered on a small unit level, for example when every function and every single variable within the resource is reordered, maximum reshuffling is achieved.

The reorder module 12 knows each objects size and the start of each object, so that it can reorder the objects without overlaps. Several objects may be grouped together to create a group and the reordering may occur on a per group basis, the reorder module 12 knowing each groups size and the start of each group. Again, the groups may be as small or as big as required All devices of the same type are divided into the same number of units, whether they be objects, groups etc., each unit having the same constituent parts. However, the reordering of the units at each device of the same type, is different. Resulting in each device having the same number of units, but reordered into a different permutation.

Some objects may require to be provided at a known position within a particular resource (not at a known address). Consequently, these non-relocatable objects are not reordered by the reorder module. The non-relocatable objects, which require to be provided at a known position, may be marked with a non-relocation flag. Conversely, relocatable objects, which do not require to be provided at a known position, may be marked with a relocation flag. As an alternative, a non-relocation database, comprising a list of objects which require to be provided at a known position within a resource, may be stored, in a non-relocatable storage module 22. Conversely, a relocation database, comprising a list of objects which do not require to be provided at a known position within a resource, may be stored in a relocatable storage module 24. When the reorder module 12 (pseudo-)randomly reorders the location of the objects within the resources, the non-relocatable objects are not reordered. The non-relocatable objects remain at their fixed position within a resource, whilst the other objects are reordered.

For example, a function that uses constant values typically has a constant values table appended to it in the form of a "literal pool". Conventionally, this table is located at the end of the function, although it is not part of the same object as the function, because the constant values are read-only data, not executable code. Therefore, the constant values table is required to be provided at a fixed known position relative to the function.

Figure 2A:
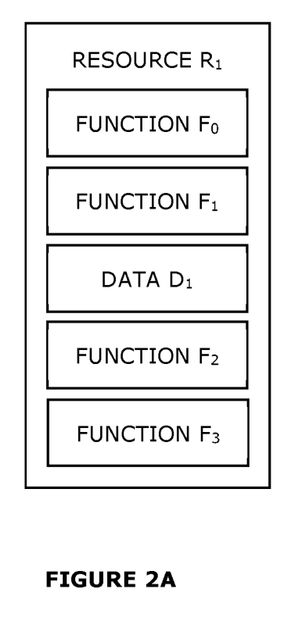
FIG. 2A illustrates schematically a resource prior to reordering.
Figure 2B:
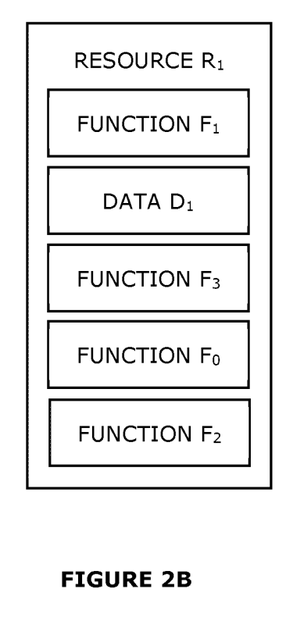
FIG. 2B illustrates schematically a resource following reordering.

FIG. 2A illustrates a resource $R_1$ provided with functions $F_0$, $F_1$, $F_2$, $F_3$ and data $D_1$. The function $F_1$ uses constant values stored in the constant values table $D_1$. Therefore, the data $D_1$ should be provided at a known position, relative to the function $F_1$ within the resource $R_1$. FIG. 2B illustrates the resource $R_1$ following reordering of the objects by a reorder module. The function $F_1$ and the data $D_1$ are provided at the same relative positions within resource $R_1$. However, the other functions $F_0$, $F_2$ and $F_3$ within the resource $R_1$ have been reordered.

As known in the art, a compiler module, of a microcontroller, generates separate ELF (Executable and Linkable Format) section files for each function (ffunction-section) in the source file, and generates separate ELF section files for each variable (fdata-section) in the source file. Conventionally, a garbage-collect linker option (gc-section) is then specified to remove all function and data references that are not used, resulting in smaller firmware images where all unreferenced code and data files are discarded.

The processor module 10 may comprise a compiler module 16 to generate sections files, the compiler module 16 generating a section file for each object and/or group of a resource which is to be reordered. The compiler generates code along with metadata which is used to reorder the section files of a resource. When reordering on as small a unit level as possible, the compiler is put into a mode where it compiles every function and every variable, at the global scope, into a dedicated linker section file, allowing for maximum reshuffling.

The reorder module 12 (pseudo-)randomises the section files to determine a device and instance specific order of the section files for the device. The relocation table indicates which addresses in an image are updated in response to reordering the sections. The device and instance specific order may be reordered at runtime or at start-up time, such that each device of the same type, is highly likely to have a different section file order. Each section file may refer to other section files by means of symbols/placeholders. Late linking may then be used, resolving the symbols as it goes along. In this way, the source code for each device does not need to be exposed to the manufacturer—the reordering of the sections is performed on the unlinked files, prior to late linking.

According to one embodiment, in the linker process a script would determine the order of sections by auto-generating a very verbose linker script that specifically determines the section order by spelling out non-wildcarded section names. The rest of the process would continue as normal As stated above, each device, and each instance of each device, has a different (pseudo-)randomised resource layout.

In order to avoid compiling and sending a new image for every device in the context of firmware updates, as required by ASLR, firmware updates are performed using an intermediate state from the linker.

The intermediate state comprises a relocatable firmware image which contains placeholders instead of final addresses for objects, such as functions and global variables. The same relocatable firmware update image is received at each device of the same type, this ensures that every device, of the same type, starts from an identical image, the relocatable firmware update image. An installer, such as a bootloader or some other part of the firmware update code, provided at each device, then converts the relocatable firmware update image to a (pseudo-) randomly relocated firmware image as a step in installing the update at the device. A seed value may be utilised to generate the relocated firmware image, and the relocation information may be saved to a relocation table. Both the relocatable firmware update image and the relocated firmware update image may be saved.

It may be difficult to test devices of the same type, when each device has a different resource layout. Therefore, when a device is to be tested, it is provided with a predetermined resource layout, as well as the relocatable firmware update image. The device may be provided with an indication of the predetermined resource layout. The indication of the predetermined resource layout, may be a relocation table defining the predetermined resource layout, or a seed value (for example, 128 bits long) which may be used to generate the predetermined resource layout. The seed value may be determined by using pseudorandom number generator (PRNG) and/or a true random number generator (TRNG).

By using a seed value, it is not necessary to communicate the whole resource layout configuration to each device/to the monitoring server. Instead, the layout configuration of the resource can be recreated by knowing the seed value and the shuffling algorithm used. As mentioned above, the device ID may be used to generate a device-specific seed value from a global seed value. Therefore, the global seed value, device ID and the shuffling algorithm used may be required in order to recreate the reordering. In another embodiment, as mentioned above, a key may be used to generate a device-specific seed value. Therefore, the key, the global seed value, device ID and the shuffling algorithm used may be required in order to recreate the reordering. The bootloader at the device which is being tested, uses the predetermined resource layout (relocation table or seed value) to convert the received relocatable firmware update image into a relocated firmware update image, the objects within each resource being relocated in accordance with the predetermined resource layout. Therefore, the relocatable firmware updates image is loaded with the resource layout defined in the predetermined resource layout. This enable the device to be tested with a known firmware layout. Following testing, the device may be rebooted/restarted in order to reorder the resource layout.

As mentioned above, the object reordering may be tracked using a relocation table. According to one embodiment, a relocation table contains:

1. the location of a pointer that is to be adjusted; and
2. the target identifier of that pointer.

When the application is "relocated", each pointer listed in the table is replaced with the new location of its target identifier. According to another embodiment, a third field may be added to the above described relocation table:

3. the relocated position of that pointer, so that the information can be run backwards, effectively rebuilding the "un-relocated" image from the relocated image.

Alternatively, the object reordering may be tracked using a seed value. By using a seed value or a relocation table to indicate the reordered layout, the signature of the device vendor can be verified at the server despite the reordering. For example, a hash-calculation may be done before the reordering or by reversing the reordering in the final image.

According to one embodiment, an installer of the relocatable firmware update image, such as a bootloader, may verify the installed and reordered firmware image by reversing the reordering of the firmware sections and then applying the hash function to the reversed reordered firmware sections in the correct order (i.e. the layout prior to reordering). Therefore, the firmware hash becomes independent of the reordering. The reversing process may require the seed value used for the reordering process to reverse the reordering.

According to another embodiment, a relocation table may be used to indicate a resource layout for the relocatable firmware update, which is part of the signed firmware update. An installer of the relocatable firmware update image, such as a bootloader, may verify the installed and reordered firmware update image, by sorting the relocation table by source address. The source address indicates the location of the objects within a resource following installation of the relocatable firmware update image but prior to reordering of the relocatable firmware update image in accordance with the resource layout for the firmware update. The hash function is then run over the installed and reordered firmware update image in source address order. By reordering the firmware update image by source address the hash runs over the installed and reordered firmware update image in the order it was originally located in the source relocatable firmware update. Therefore, the reordering of the firmware update image following installation is eliminated from the hashing.

According to one embodiment, the remote server may deliver to a device a relocated image as a relocation table or as a generation seed used, together with and the original signature and the relocation information used. This allows the receiving device to verify the original signature against the received image, by reversing the reordering, and the receiving device does not have to trust the server as a result.

The firmware may include allowed split-lines for the firmware image and information on the relocation position, both being covered by the firmware signature. Split lines are generated from the compilers section information. The split lines are located at (pseudo-)random section-boundaries between functions and usually contain more than one compiler section. Relocation information is then maintained on per split-line block, as opposed to per section. This reduces the amount of section information transmitted to the device and the complexity of the devices parser to resolve reordering. In the most simple case the split-lines are on section borders (the split-lines and sections are equivalent in this case). The choice of split-lines is unpredictable to a possible attacker, therefore the reordering is less predictable to the attacker, since the attacker is not able to predict the split-lines chosen during firmware creation. This results in a low overhead during installation and reduced meta-data overhead during the firmware update transmission.

When split lines are used, the relocation table indicates which addresses in an image, on a per split-line block basis, are updated in response to the reordering within a resource. A translation table may be generated from the split lines relocation table and indicates where the split-line blocks within a resource have moved.

Every section/split-line block may have many relocation entries, depending on whether code or data in these sections/split-line blocks contains absolute references to other parts of the image. Relative references are not allowed across split line boundaries.

According to one embodiment, a relocation table or seed value may be used to reconfigure the firmware to a defined layout, in circumstances other than for testing purposes. In this embodiment, only the relocation table or seed value may be sent to the device. For example, a high security device may be provided with a relocation table defining a layout which specifies locations for each object, such as function or global variable, that have been determined to offer the greatest security against a threat. The relocation table may comprise more than one layout.

For a firmware update, it is sometimes useful for a device to be able to rebroadcast their own firmware image. To accomplish this, a device may use the relocation table to reconstruct their relocatable firmware updates image.

As stated above, the relocation table defines the reordered layout configuration of the resource (the addresses of the relocated objects within each resource). Alternatively, or in addition, to the relocation table, the reordered layout configuration of the resource may be reduced to a seed value (for example, 128 bits long). The seed value may be determined by using a pseudorandom number generator (PRNG) and/or a true random number generator (TRNG). The seed value may be determined by the reorder module 12 provided at the device, or by the remote server.

Reordering of the resource layout, not only helps prevent or mitigate against attacks, but may also be used to detect attempts to attack devices. Such attempts may be statistically observed and logged to generate and detect attack patterns. In addition, devices or monitoring servers observing such attack patterns at a device may activate security countermeasures at the device, such as a reboot at the device. In some devices, it is possible to reboot one or more specified resources of the device, in instances where an attack is targeting a specific resource, rather than rebooting the entire device.

There are a number of ways to detect attacks on devices. For example:
- A marked increase in data validation errors generated may indicate an attack on a device;
- When a device receives many TCP SYN packets, responds with SYN/ACK and doesn't receive an ACK packet, this implies that the device is being scanned, which may be the precursor for an attack;
- A device may start seeing an unusual increase in MPU faults;
- An attack which is close to success but still failing would cause device crashes, or unexpected behaviour such as hangs. This can be detected with monitoring of watchdog resets and hardware exceptions;
- Monitoring of device behaviour or network traffic;
- Comparing the devices behaviour or network traffic to adjacent devices and similar devices in other networks by an external monitoring system.

As stated above, the reorder module 12, changes the resource layout of a device upon reboot, for example whenever the device is restarted. However, when an attack on a device is detected, a reboot of the device may be initiated, such that the reorder module 12, changes the resource layout in order to try and prevent the attack from being successful. Alternatively, when an attack on a device is detected, it may be determined whether the current resource layout is preventing the attack from being successful. When it is determined that the current resource layout is not preventing the attack from being successful, then a reboot of the device may be initiated, such that the reorder module 12 changes the resource layout of the device. Alternatively, or in addition, when an attack on a device is detected, a rating module may rate the current resource layout, the rating indicating the current resource layouts ability to prevent the attack from being successful. As a result of the rating, a reboot of the device may be initiated, such that the reorder module 12 changes the memory layout of the device. For example, a rating indicating that the current resource layout is not preventing the attack from being successful may initiate a reboot of the device, whereas a rating indicating that the current resource layout is preventing the attack from being successful may not initiate a reboot of the device.

The rating may be as simple as indicating whether the current resource layout prevents the attack from being successful. Alternatively, the rating may provide an indication as to how successful the current resource layout is at preventing the attack. For example, the rating may indicate how long the current resource layout defended against the attack before the attack was successful.

A logging module 18 may also log the attack on the device and send the log to a remote monitoring server 400.

Figure 3:
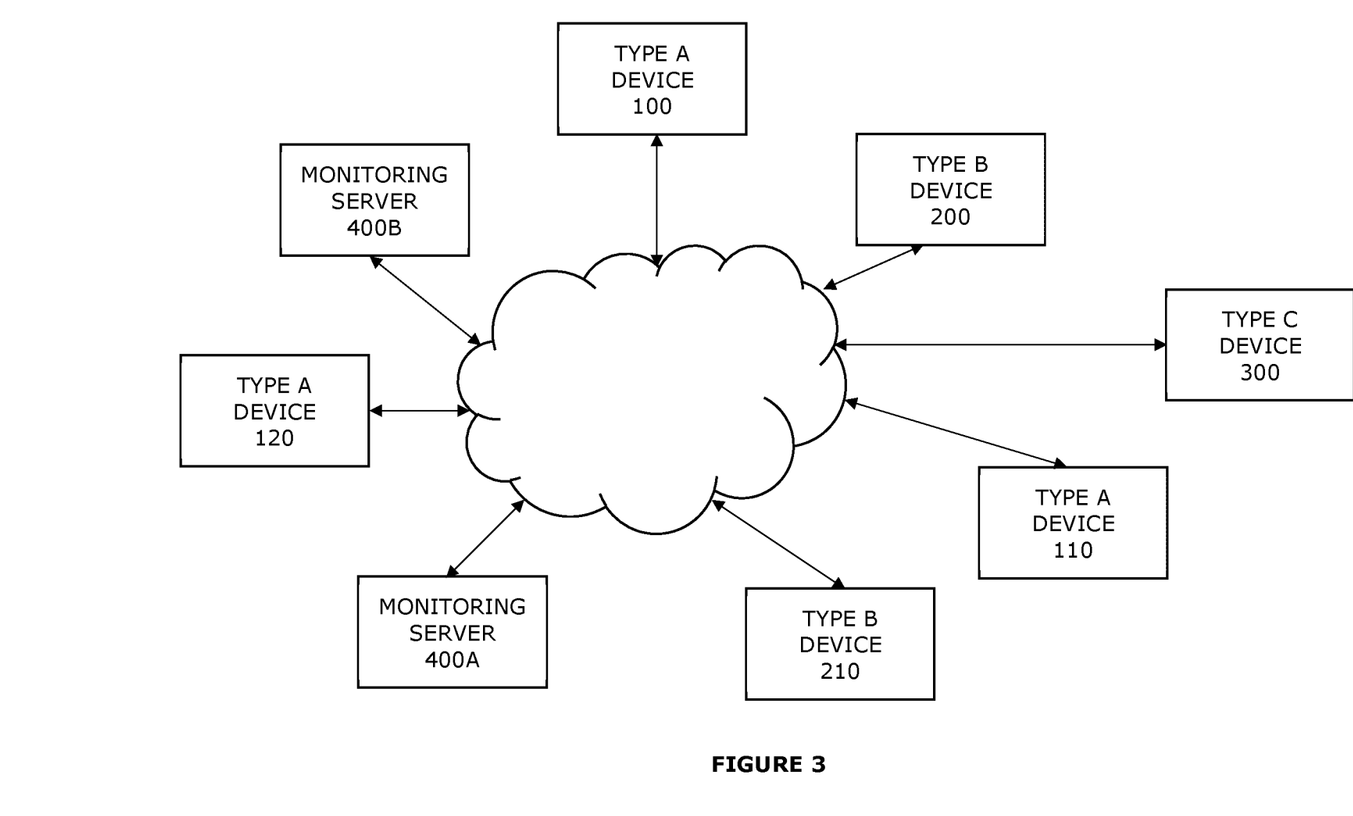
FIG. 3 illustrates schematically monitoring severs monitoring a plurality of devices.

FIG. 3 illustrates one or more monitoring servers 400A, 400B monitoring a plurality of different devices 100, 110, 120, 200, 210, 300, of several different types, type A, type B, type C.

Alternatively, or in addition, a monitoring server 400A, 400B may determine that a device (e.g. device 100) is under attack, and may issue a command to that device (device 100) to reboot the device, such that the reorder module 12 at the device 100 reorders the resource layout. The monitoring server 400A, 400B may issue the reboot command when it is determined that the current resource layout at the device (device 100) is not preventing the attack from being successful. Alternatively, or in addition, a monitoring server 400A, 400B may determine that a device of a specific type (type A) is under attack, and issue a command to all of the devices of that type (devices 100, 110, 120) to reboot, such that the reorder module 12 at each device 100, 110, 120, reorders the memory layout of that device.

According to another embodiment, a monitoring server 400A, 400B may comprise a reorder module. The reorder module at the monitoring server determines reordered locations of the objects within each resource at the device. The monitoring server may then either transfer a relocation table defining the reordered locations, or a seed value for generating the reordered locations, to the device.

The monitoring server may also determine a set of reordered locations of the objects within each resource at the device. The monitoring server may then either transfer a randomly assigned one of the set of relocation tables defining the reordered locations, or a randomly assigned one of the set of seed values to each device in a group of devices, such as devices of the same type.

Figure 4:
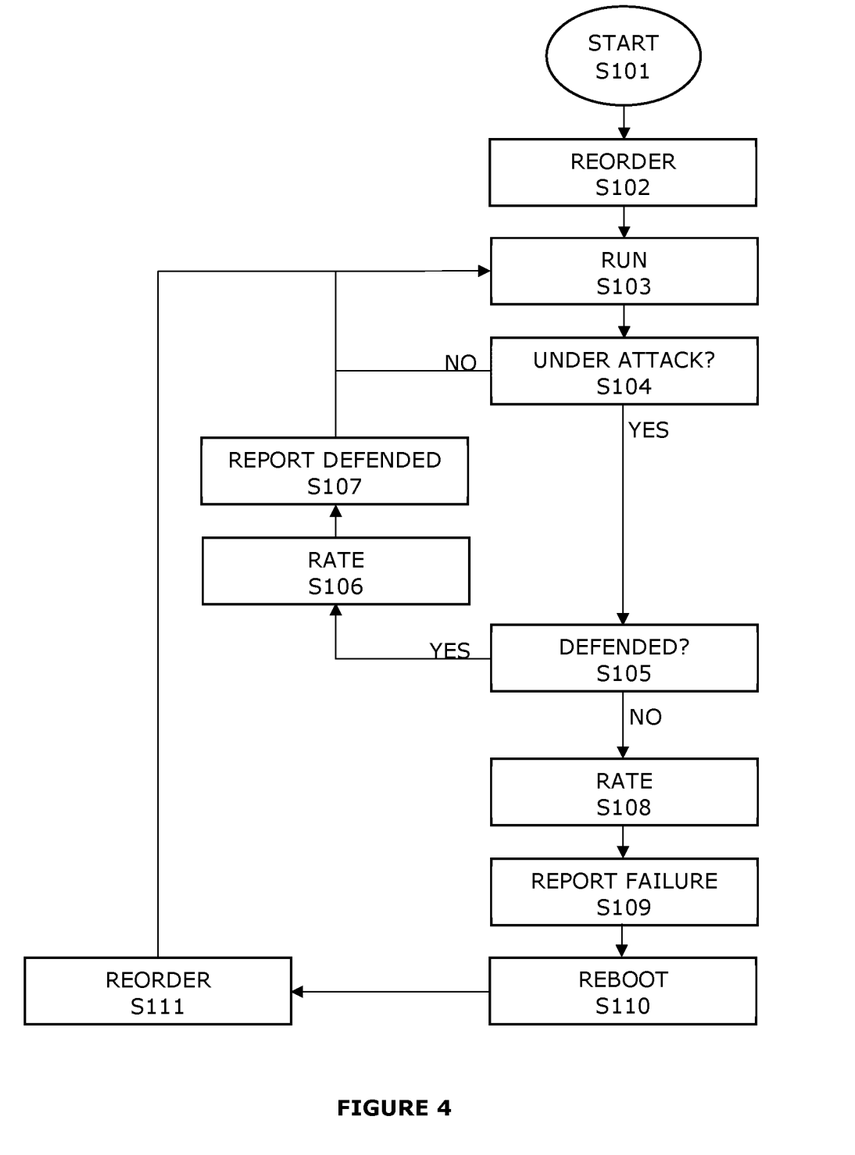
FIG. 4 illustrate a process for mitigating against attacks at a device.

FIG. 4 illustrate a process for mitigating against attacks at a device. With reference to FIG. 4, the device is started at step S101. At step S102, the resource layout at the device is reordered and at step S103, the device is run. Step S102, is an optional step in that it is not always necessary to reorder the resource layout upon start-up of the device. However, since it is desirable for devices of the same type to start with different resource layouts, step S102 may be performed.

At step S104 it is determined whether the device is under attack. When it is determined that the device is not under attack ("NO"), the process returns to step S103 and the device continues running. The monitoring as to whether the device is under attack may be performed at the device and/or at a monitoring sever. The device may comprise a monitoring module 20. Alternatively, or in addition, the server may comprise a monitoring module.

When it is determined that the device is under attack ("YES"), the process moves onto step S105. At step S105, it is determined whether the current resource configuration is effective at defending the device against the attack. When the current resource configuration is defending the device against the attack ("YES"), then the defence provided is rated at step S106 and a report sent to a remote monitoring server at step S107. A rating module may determine whether the current resource configuration is effective at defending the device against the attack. When the current resource configuration is effective at defending the device against the attack, then it may be determined that a reboot of the device is not required. The device may comprise the rating module 26. Alternatively, or in addition, the server may comprise the rating module and rates the current memory configuration. Therefore, the rating, at step S106, may be performed after the reporting at step S107.

The rating, at step S106, and reporting at step S107, may be performed at the same time. Together with the rating and reporting of the current resource configuration, details regarding the current resource configuration, such as the location of each object and/or group (function or global variable etc.) may be provided to the monitoring server. The current resource configuration may be provided to the monitoring server as a relocation table, or a seed value.

When the current resource configuration does not successfully defend the device against the attack ("NO"), then the defence provided is rated at step S108 and a report sent to a remote server at step S108. The rating, at step S108, and reporting at step S109, may be performed at the same time. According to another embodiment, the server may comprise the rating module and rates the current memory configuration. Therefore, the rating, at step S108, may be performed after the reporting at step S109.

Together with the rating and reporting of the current resource configuration, details regarding the current resource configuration, such as the location of each object and/or group (function or global variable etc.) may be provided to the monitoring server. The current resource configuration may be provided to the monitoring server as a relocation table, or a seed value. The details regarding the defence failure may be provided, such as memory/security faults; stack faults; alignment faults; instruction faults; any system exception etc.

When the current resource configuration is not effective at defending the device against the attack, then it may be determined that a reboot of the device is required. The device is rebooted at step S110, and the resource layout reordered at step S111. The device then continues running at step S103, and the process begins again.

One example of defence rating would be: a defence is rated highly if an attack precursor is detected (scans) or an attack is detected (data validation errors) and it generates MPU faults but not resets or hardware exceptions. However, other rating algorithms are possible. According to one embodiment, the rating may be as simple as the current resource configuration does/does not defend the device against the attack.

The method of FIG. 4, can be used with the resource layout (pseudo-)randomisation process described above with reference to microcontrollers. However, the method of FIG. 4, can also be utilised by systems which incorporate ASLR in order to randomise the memory layout. When the method of FIG. 4 is applied to a device or system which comprises a MMU, instead of restarting the CPU, only the process/resource which is under attack may be restarted, although the entire device could be rebooted.

Figure 5:
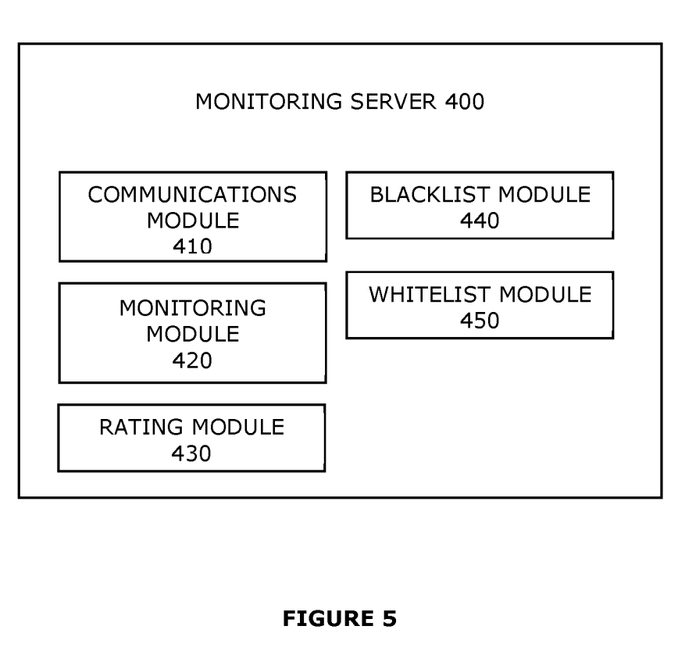
FIG. 5 illustrates schematically a monitoring server.

Each device reports to a remote monitoring server, such as the monitoring server 400 illustrated in FIG. 5. The monitoring server comprises a communications module 410 for communicating with one or more devices, using known communication techniques, such as WiFi, Bluetooth, 4G etc. Each device also comprises a communications module 28 for communicating with one or more monitoring servers, using known communication techniques, such as WiFi, Bluetooth, 4G etc. The sever 400 receives reports from at least one device, the report comprising information about an attack on the device and the layout configurations adopted by the device. The report also comprises data regarding the success or failure of each of the layouts. The reports are analysed by a monitoring module 420 provided at the monitoring server.

The reports comprise details of the resource layouts that did/did not defend the device, such that the server can determine which resource layouts were the most successful at defending against attacks and which memory configurations were not successful.

The monitoring module 420 may also monitors whether a device is under attack. The monitoring module 420 may determine that a device is under attack by detecting known indicators as described above, such as a marked increase in data validation errors etc. The server 400 may also comprise a rating module 430 for rating the received resource layouts from the devices.

Following receipt of one or more reports from the devices, the monitoring server may generate a list of acceptable resource layouts and unacceptable resource layouts with regards to the attack risk presented by each resource layout.

According to one embodiment, the server 400 may generate a "blacklist" of resource layout configurations which are considered to be undesirable and which are compiled as a result of the received reports. Alternatively, or in addition, the server 400 may generate a "blacklist" of specific locations for each object and/or group (function/global variable etc.) which are considered to be undesirable for that function/global variable and which are compiled as a result of the received reports. The "blacklist" of resource layout configurations and/or specific locations for each function/global variable are stored in a blacklist module 440 at the server 400.

The "blacklist" of resource layout configurations and/or specific locations may be reduced to a "blacklist" of seed values, each blacklisted seed value corresponding to a resource layout configuration and/or a specific location. The seed values may be stored in a blacklist module 440 at the server 400.

The server 400 may generate a "whitelist" of resource layout configurations which are considered to be desirable, or at least acceptable, which are compiled as a result of the received reports. Alternatively, or in addition, the server 400 may generate a "whitelist" of specific locations for each object and/or group (function/global variable etc.) which are considered to be desirable, or at least acceptable, for that function/global variable and which are compiled as a result of the received reports. The "whitelist" of resource layout configurations and/or specific locations for each function/global variable are stored in a whitelist module 450 at the server 400.

The "whitelist" of resource layout configurations and/or specific locations may be reduced to a "whitelist" of seed values, each whitelisted seed value corresponding to a resource layout configuration and/or a specific location. The seed values may be stored in a whitelist module 450 at the server 400.

The seed values may be used to generate resource layout configurations. The blacklisted/whitelisted seed values may be exchanged between the device and the remote server and/or between the remote server and one or more devices more easily than a relocation table. The seed values may also be tracked at the remote server for determining the rating of the resource layout configuration.

The actual shuffling/reordering of the resource layout configurations performed at each device is different for each device following installation of the firmware and application of a TRNG/PRNG for seeding the device specific resource layout configurations. This results in a very resilient device base against a wide range of attacks that require the attacker to know locations of code and data objects.

Following (pseudo-)randomisation of the resource layout, for example, based on a seed value as discussed above, a check is performed to confirm that the randomised resource layout does not contravene one of the blacklisted layouts and/or one or more of the blacklisted specific locations. When a reordered resource layout does contravene one of the blacklisted layouts and/or one or more of the blacklisted specific locations another reboot is performed. This means that devices may protect against exploits even before a proper fix is issued using the regular firmware update mechanism.

The server 400 may issue a "whitelisted" resource layout to one or more of the devices of the same type, in order to reconfigure the firmware in to a defined "whitelisted" resource layout, which has been determined to provide protection against a known attack until a fix is issued using the regular firmware update mechanism. Only a "whitelisted" relocation table is required to be sent to the device(s). The monitoring server may provide N different relocation tables to M different devices of the same type.

Alternatively, or in addition, the server 400 may issue a "whitelisted" seed value to one or more of the devices of the same type, in order to reconfigure the firmware to a "whitelisted" resource layout defined by the seed value, which has been determined to provide protection against a known attack until a fix is issued using the regular firmware update mechanism. Whitelisting is also useful for ensuring that only layout configurations from a pool of tested and/or certified variants are used. The monitoring server may provide N different seed values to M different devices of the same type.

As part of the rating process, the server and/or the device (depending on the capacity of the device) may determine a fitness function for each different layout configuration, with regards to how successful each configuration was at defending the device from an attack. The device may comprise a fitness function module for determining the fitness function. The fitness function module may be provided at the rating module 26.

It is possible that a layout configuration may not be able to defend a device from attacks indefinitely. However, the layout configuration may be reordered, one or more times, in response to detecting an attack, whilst a patch is devised to combat a specific attack and/or until a fix is issued using the regular firmware update mechanism. Therefore, the process of FIG. 3 may be run at each device until a layout configuration is obtained which has a fitness function which is greater than a predetermined threshold function.

According to one embodiment, a device may not report a resource layout configuration unless the resource layout configuration has a fitness function above a predetermined threshold amount.

A device may also comprise a logging module 18 for logging pre-trigger events before for an attack. For example, by running a logging module in the background recording, for example, the last 100 ms at the device, when an event occurs, such as an attack, the device is able to transfer the last 100 ms to the server for analysis. When the server is in communication with more than one device of the same type, it is able to perform analysis based on the pre-trigger logs received from the more than one device and identify patterns, which can help when designing a patch to combat any attack.

As stated above, when it is determined that a device is under attack, details regarding the current "reordered" resource layout configuration may be provided to the monitoring server. In addition, firmware crash reports, and other information such as malware-detection output, call-graphs for malware-detection etc. that comprises the current "reordered" resource layout configuration may also be provided to the monitoring server. However, it may be advantageous to hide the reordered resource layout configuration from the monitoring server. Therefore, according to one embodiment, the address-references to the reordered layout configuration in data sent back to the monitoring server, such as in crash-reports, may be normalized prior to being transferred to the monitoring server. The address-references may be normalized by reversing the reordering of the resource layout or by using an arbitrary seed value to reorder the address-references of the reordered resource layout. According to one embodiment, all devices of the same type may normalize the address-references of their resource layout configurations to a single, common layout configuration, such as by using the same arbitrary seed value, therefore hiding the actual device specific layout configurations from the monitoring server. The layout configuration itself is not reordered, for example, all of the (reordered) objects in the resource stay untouched, it is merely the address-references which are normalized. This embodiment is advantageous in that the devices do not need to share their seed value with the monitoring server, each device may hide their actual resource layout configurations from the monitoring server. In addition, the monitoring server may directly correlate/compare all the received layouts without adjusting for the reordering of the layouts at each different device from which it is receiving attack reports since the address references are now consistent across all devices, despite the reordering of the actual data. Moreover, the monitoring server does not need to learn each devices resource layout configurations. Consequently, even if an attacker was able to break into the monitoring server, that attacker would not be able to infer the specific reordered resource layout configuration of each device.

The above method may also be applied to devices that load their firmware from flash into RAM, such as ESP8266 and the Realtek Amoeba line. According to this embodiment, a ROM-boot loader, or an A-class NAND-boot, may perform a load from flash and reorder the resource layout on the fly while reading them from flash and copying them to SRAM.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the device, partly on the device and partly on a remote server or entirely on the remote server. In the latter scenario, the remote server may be connected to the device through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, the preferred embodiment of the present techniques may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present techniques.

As will be appreciated from the foregoing specification, techniques are described providing a machine implemented method for defending a device comprising at least one resource against attacks.

According to techniques, the method further comprises: rating, at said device, an effectiveness of said layout of said at least one resource at protecting said device against said attack; and transferring said rating together with said determination and said layout of said at least one resource to said remote monitoring server.

According to techniques, the method further comprises: rating, at said remote monitoring server, an effectiveness of said layout of said at least one resource at protecting said device against said attack.

According to techniques, said device determines that said layout of said at least one resource should be changed.

According to techniques, said remote monitoring server determines that said layout of said at least one resource should be changed.

According to techniques, the method further comprises: using a seed value to generate said layout of said at least one resource and said reordered layout of said at least one resource.

According to techniques, transferring said layout of said at least one resource comprises transferring said seed value to said remote monitoring server.

According to techniques, the method further comprises: storing said layout of said at least one resource and said reordered layout of said at least one resource in a relocation table.

According to techniques, transferring said layout of said at least one resource comprises transferring said relocation table to said remote monitoring server According to techniques, the method further comprises: receiving from said remote monitoring server a layout of said at least one resource determined to be effective at protecting said device against said attack; and changing said layout of said at least one resource by reordering said objects within said at least one resource in accordance with said received layout.

According to techniques, said received layout comprises a seed value for generating said layout of said at least one resource determined to be effective at protecting said device against said attack.

According to techniques, said received layout comprises a relocation table indicating said layout of said at least one resource determined to be effective at protecting said device against said attack.

According to techniques, the method further comprises: generating, at a compiler, each said object as a section; and wherein changing said layout of said at least one resource comprises reordering said sections within said at least one resource with respect to each other.

According to techniques, the method further comprises: generating split lines at boundaries between said sections to define split line blocks, each split line block comprising more than one section; and wherein changing said layout of said at least one resource comprises reordering said split line blocks within said at least one resource with respect to each other.

According to techniques, said device comprises two or more resources, and said method further comprises: determining that a layout of objects within one of said two or more resources at said device is not protecting said device against said attack; and changing said layout of said one of said two or more resources by reordering said objects within said one of said two or more resources with respect to each other.

According to techniques, the method further comprises: receiving a relocatable firmware update image from said remote server; installing said relocatable firmware update image at said device; and changing said layout of said at least one resource following installation of said relocatable firmware update image at said device to generate a relocated firmware update image.

According to techniques, the method further comprises: receiving a firmware update layout from said remote server, said firmware update layout defining a firmware update layout of said at least one resource at said device; installing said relocatable firmware update image at said device in accordance with said firmware update layout; and testing of said device having said firmware update layout prior to changing said layout of said at least one resource following installation of said relocatable firmware update image to generate said relocated firmware update image.

According to techniques, said firmware update layout comprises a relocatable table indicating said layout of said at least one resource at said device.

According to techniques, said firmware update layout comprises a seed value for generating said layout of said at least one resource at said device.

According to techniques, said seed value comprises a device specific seed value derived from a global seed value for said firmware update layout and a device specific identifier.

According to techniques, the method further comprises: verifying said installed relocated firmware update image by reversing said changes to said layout of said at least one resource and then applying a hash function to said reversed layout of said at least one resource.

According to techniques, the method further comprises: verifying said installed and reordered relocatable firmware update image by sorting said relocation table by source address, and then applying a hash function to said installed and reordered relocatable firmware update image in source address order.

According to techniques, the method further comprises: transferring crash-reports and other information comprising said reordered layout of said at least one resource, to said remote monitoring server; and normalizing address references to said reordered layout of said at least one resource in said crash-reports and other information prior to transferring said crash-reports and other information to said remote monitoring server; wherein said address references are normalized by reversing the reordering of the resource layout.

According to techniques, the method further comprises: transferring crash-reports and other information comprising said reordered layout of said at least one resource, to said remote monitoring server; and normalizing address references to said reordered layout of said at least one resource in said crash-reports and other information prior to transferring said crash-reports and other information to said remote monitoring server; wherein said address references are normalized by using an arbitrary seed value to reorder the address-references of the reordered resource layout.

Techniques are also described providing a machine implemented method for defending a plurality of devices against attacks, each device comprising at least one resource.

According to techniques, the method further comprises: determining a rating for said received layout, said rating defining an effectiveness of said received layout at protecting said device against said attack.

According to techniques, the method further comprises: receiving a rating for said received layout from said at least one of said plurality of devices, said rating defining an effectiveness of said received layout at protecting said device against said attack.

According to techniques, said received indication of said layout comprises a seed value for generating said layout of objects within said at least one resource at said device.

According to techniques, said received layout comprises a relocation table indicating said layout of objects within said at least one resource at said device.

According to techniques, the method further comprises: transferring an indication of a layout of said at least one resource determined to be effective at protecting said device against said attack to said device; and changing said layout of said at least one resource by reordering objects within said at least one resource in accordance with said received layout.

According to techniques, said transferred layout comprises a seed value for generating said layout of said at least one resource.

According to techniques, said transferred layout comprises a relocation table indicating said layout of layout of said at least one resource.

According to techniques, the method further comprises: receiving an attack report from a plurality of said devices indicating that said attack at said plurality of devices is the same; determining a whitelist of layouts of said at least one resource determined to be effective at protecting said devices against said attack; and transferring a whitelisted layout of said at least one resource to said plurality of devices.

According to techniques, the method further comprises: determining a black list of layouts of said at least one resource determined to not be effective at protecting said devices against said attack.

According to techniques, said attack report further comprises pre-trigger events which occurred prior to said attack.

Techniques are also described providing a supervisor module for defending a device comprising at least one resource against attacks.

According to techniques, said rating module further determines a rating associated with said layout of said at least one resource, rating an effectiveness of said layout of said at least one resource at protecting said device against said attack; and said communication module transfers said rating together with said determination and said indication of said layout of said at least one resource to said remote monitoring server.

According to techniques, said rating module determines that said layout of said at least resource should be changed.

According to techniques said supervisor module, further comprises: a seed generating module for generating a seed value indicating said layout of said at least one resource and a seed value indicating said reordered layout of said at least one resource.

According to techniques, said supervisor module said communication module further transfers said seed value indicating said layout of said at least one resource to said remote monitoring server.

According to techniques, said communications module further receives from said remote monitoring server an indication of a layout of said at least one resource determined to be effective at protecting said device against said attack; and said reorder module changes said layout of said at least one resource by reordering objects within said at least one resource in accordance with said received layout.

According to techniques, said indication of said layout of said at least one resource comprises a relocation table indicating said layout of layout of said at least one resource.

According to techniques, said received layout comprises a seed value indicating said layout of said at least one resource determined to be effective at protecting said device against said attack.

According to techniques, said reorder module comprises: a randomized pool allocator module for reordering said objects randomly within said at least one resource.

According to techniques, said indication of said layout of said at least one resource comprises a seed value.

According to techniques, said reorder module comprises: a pseudorandom number generator (PRNG) and/or a true random number generator (TRNG), and said seed value is used in said pseudorandom number generator (PRNG) and/or a true random number generator (TRNG) to generate said reordered layout of said at least one resource.

According to techniques, said device comprises two or more resources; said rating module further determines that said layout of one of said two or more resources is not protecting said device against said attack; and said reorder modules changes said layout of said one of said two or more resources.

According to techniques, said supervisor module further comprises: a communications module for receiving a relocatable firmware update image from a remote server; and wherein said reorder module installs said relocatable firmware update image by changing said layout of said at least one resource following installation of said relocatable firmware update image at said device to generate a relocated firmware update image.

According to techniques, said communications module further receives an indication of a firmware update layout from said remote server, said firmware update layout defining a firmware update layout of said at least one resource at said device, and wherein said reorder module further installs said relocatable firmware update image at said device in accordance with said firmware update layout, and tests said device having said firmware update layout prior to changing said layout of said at least one resource following installation of said relocatable firmware update image to generate said relocated firmware update image.

According to techniques, said indication of said firmware update layout comprises a relocatable table defining said layout of said at least one resource at said device.

According to techniques, said indication of said firmware update layout comprises a seed value indicating for generating said layout of said at least one resource at said device.

According to techniques, said communications module further receives an indication of a firmware update layout from said remote server, said indication of said firmware update layout defining a firmware update layout of said at least one resource at said device, and wherein said reorder module installs said relocatable firmware update image at said device in accordance with said firmware update layout, and tests said device having said firmware update layout prior to changing said layout of said at least one resource following installation of said relocatable firmware update image to generate said relocated firmware update image.

According to techniques, said firmware update layout comprises a relocatable table defining said layout of said at least one resource at said device.

According to techniques, said firmware update layout comprises a seed value defining said layout of said at least one resource at said device.

Techniques are also described providing a remote monitoring server for defending a plurality of devices against attacks.

According to techniques, said remote monitoring server further comprises: a rating module for determining an effectiveness of said received layout at protecting said device against said attack.

According to techniques, said communications module further receives a rating associated with said received layout of said at least one resource, said rating indicating an effectiveness of said received layout at protecting said device against said attack.

According to techniques, said indication of said layout of said at least one resource at said device comprises a relocation table.

According to techniques, said indication of said layout of said at least one resource at said device comprises a seed value.

According to techniques, said remote monitoring server further comprises: a logging module for receiving pre-trigger events from one or more of said plurality of devices reporting said attacks.

The invention claimed is:

1. A machine implemented method for defending a device comprising at least one resource against attacks, the method comprising:
   detecting that said device is subject to an attack;
   in response to the detecting, determining whether a layout of objects within said at least one resource at said device is protecting said device against said attack;
   transferring said determination and said layout of said at least one resource associated with said determination to a remote monitoring server;
   generating a rating of an effectiveness of said layout of said at least one resource at protecting said device against said attack, the rating indicating a degree of effectiveness between being effective at preventing the attack and being ineffective at preventing the attack;
   determining that said layout of said at least one resource should be changed;
   changing said layout of said at least one resource by reordering said objects within said at least one resource with respect to each other; and
   tracking said reordered layout of said at least one resource.

2. The machine implemented method of claim 1, wherein said generating the rating is performed at said device, the method further comprising:
   transferring said rating together with said determination and said layout of said at least one resource to said remote monitoring server.

3. The machine implemented method of claim 1,
   wherein said generating the rating is performed at said remote monitoring server.

4. The machine implemented method of claim 1, wherein said device determines that said layout of said at least one resource should be changed.

5. The machine implemented method of claim 1, wherein said remote monitoring server determines that said layout of said at least one resource should be changed.

6. The machine implemented method of claim 1, further comprising:

using a seed value to generate said layout of said at least one resource and said reordered layout of said at least one resource.

7. The machine implemented method of claim 6, wherein transferring said layout of said at least one resource comprises transferring said seed value to said remote monitoring server.

8. The machine implemented method of claim 1, further comprising:
storing said layout of said at least one resource and said reordered layout of said at least one resource in a relocation table.

9. The machine implemented method of claim 8, wherein transferring said layout of said at least one resource comprises transferring said relocation table to said remote monitoring server.

10. The machine implemented method of claim 1, further comprising:
receiving from said remote monitoring server a layout of said at least one resource determined to be effective at protecting said device against said attack; and
changing said layout of said at least one resource by reordering said objects within said at least one resource in accordance with said received layout.

11. The machine implemented method of claim 1, further comprising:
generating, at a compiler, each said object as a section; and wherein changing said layout of said at least one resource comprises reordering said sections within said at least one resource with respect to each other.

12. The machine implemented method of claim 11, further comprising:
generating split lines at boundaries between said sections to define split line blocks, each split line block comprising more than one section; and wherein changing said layout of said at least one resource comprises reordering said split line blocks within said at least one resource with respect to each other.

13. The machine implemented method of claim 1, wherein said device comprises two or more resources, and said method further comprises:
determining that a layout of objects within one of said two or more resources at said device is not protecting said device against said attack; and
changing said layout of said one of said two or more resources by reordering said objects within said one of said two or more resources with respect to each other.

14. The machine implemented method of claim 1, further comprising:
receiving a relocatable firmware update image from said remote server;
installing said relocatable firmware update image at said device; and
changing said layout of said at least one resource following installation of said relocatable firmware update image at said device to generate a relocated firmware update image.

15. The machine implemented method of claim 14, further comprising:
receiving a firmware update layout from said remote server, said firmware update layout defining a firmware update layout of said at least one resource at said device;
installing said relocatable firmware update image at said device in accordance with said firmware update layout; and testing of said device having said firmware update layout prior to changing said layout of said at least one resource following installation of said relocatable firmware update image to generate said relocated firmware update image.

16. The machine implemented method of claim 1, further comprising:
transferring crash-reports and other information comprising said reordered layout of said at least one resource to said remote monitoring server; and
normalizing address references to said reordered layout of said at least one resource in said crash-reports and other information prior to transferring said crash-reports and other information to said remote monitoring server;
wherein said address references are normalized by reversing the reordering of the resource layout.

17. The machine implemented method of claim 1, further comprising:
transferring crash-reports and other information comprising said reordered layout of said at least one resource to said remote monitoring server; and
normalizing address references to said reordered layout of said at least one resource in said crash-reports and other information prior to transferring said crash-reports and other information to said remote monitoring server;
wherein said address references are normalized by using an arbitrary seed value to reorder the address-references of the reordered resource layout.

18. A system for defending a device comprising at least one resource against attacks, the system comprising one or more processors configured for:
detecting that said device is subject to an attack;
in response to the detecting, determining whether a layout of objects within said at least one resource at said device is protecting said device against said attack;
transferring said determination and an indication of said layout of said at least one resource associated with said determination to a remote monitoring server;
generating a rating of an effectiveness of said layout of said at least one resource at protecting said device against said attack, the rating indicating a degree of effectiveness between being effective at preventing the attack and being ineffective at preventing the attack;
if the determining determines that the layout is protecting said device against said attack, continuing with said layout of said at least one resource; or alternatively;
changing said layout of said at least one resource by reordering said objects within said at least one resource with respect to each other when is it determined that said layout of said at least resource should be changed; and
tracking said reordered layout of said at least one resource.

19. A method for defending a device comprising at least one resource against attacks, the method comprising:
receiving a relocatable firmware update image from a remote server;
changing a layout of said at least one resource by reordering objects within said at least one resource with respect to each other; installing said relocatable firmware update image by reordering said at least one resource according to said changed layout following installation of said relocatable firmware update image to generate a relocated firmware update image;
tracking said reordered layout of said at least one resources;

determining whether said reordered layout is protecting said device against said attack; and generating a rating of an effectiveness of said reordered layout at protecting said device against said attack, the rating indicating a degree of effectiveness between being effective at preventing the attack and being ineffective at preventing the attack.

20. A non-transitory computer-readable storage medium comprising program code for performing the method of claim 1.

* * * * *